(12) United States Patent
Yang

(10) Patent No.: US 12,245,313 B2
(45) Date of Patent: Mar. 4, 2025

(54) RADIO COMMUNICATION METHOD AND TERMINAL APPARATUS

(71) Applicant: GUANGDONG OPPO MOBILE TELECOMMUNICATIONS CORP., LTD., Dongguan (CN)

(72) Inventor: Haorui Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 271 days.

(21) Appl. No.: 17/531,255

(22) Filed: Nov. 19, 2021

(65) Prior Publication Data

US 2022/0078878 A1 Mar. 10, 2022

Related U.S. Application Data

(63) Continuation of application No. PCT/CN2019/115126, filed on Nov. 1, 2019.

(51) Int. Cl.
*H04W 76/27* (2018.01)
*H04W 74/00* (2009.01)
*H04W 88/06* (2009.01)

(52) U.S. Cl.
CPC ......... *H04W 76/27* (2018.02); *H04W 74/004* (2013.01); *H04W 88/06* (2013.01)

(58) Field of Classification Search
CPC ... H04W 76/27; H04W 74/004; H04W 88/06; H04W 76/34; H04W 36/0011; H04W 36/0055; H04W 36/04; H04W 88/02; Y02D 30/70
See application file for complete search history.

(56) References Cited

U.S. PATENT DOCUMENTS

| | | | |
|---|---|---|---|
| 12,082,286 B2 * | 9/2024 | Won | H04W 76/27 |
| 2017/0332431 A1 | 11/2017 | Kim et al. | |
| 2018/0070402 A1 * | 3/2018 | Chinthalapudi | H04L 65/1083 |
| 2019/0141515 A1 * | 5/2019 | Kim | H04W 52/0219 |
| 2019/0141776 A1 * | 5/2019 | Kim | H04W 76/20 |
| 2020/0137820 A1 * | 4/2020 | Kim | H04W 4/70 |
| 2020/0214070 A1 * | 7/2020 | Ingale | H04W 76/19 |

(Continued)

FOREIGN PATENT DOCUMENTS

| CN | 107277835 A | 10/2017 |
|---|---|---|
| CN | 108024221 A | 5/2018 |

(Continued)

OTHER PUBLICATIONS

Extended European Search Report issued in corresponding European application No. 23176509.0, mailed Aug. 24, 2023.

(Continued)

*Primary Examiner* — Edan Orgad
*Assistant Examiner* — Malick A Sohrab
(74) *Attorney, Agent, or Firm* — BAYES PLLC

(57) ABSTRACT

Provided are a radio communication method and a terminal device. The method includes a radio resource control (RRC) layer of the terminal device sending indication information to a non-access stratum (NAS) of the terminal device. The indication information includes a first state indication indicating a first RRC state. The method also includes the NAS of the terminal device transferring the NAS of the terminal device to a first NAS state.

12 Claims, 2 Drawing Sheets

200

A radio resource control (RRC) layer of a terminal device sends indication information to a non-access stratum (NAS) of the terminal device, where the indication information includes first state indication that is used for indicating a first RRC state — S210

The NAS of the terminal device transfers the NAS of the terminal device to a first NAS state according to the first state indication — S220

(56) References Cited

U.S. PATENT DOCUMENTS

| | | | |
|---|---|---|---|
| 2021/0045180 A1* | 2/2021 | Lindheimer | H04W 76/27 |
| 2021/0144675 A1* | 5/2021 | Zhang | H04W 76/32 |

FOREIGN PATENT DOCUMENTS

| | | |
|---|---|---|
| CN | 109891919 A | 6/2019 |
| CN | 109936878 A | 6/2019 |
| EP | 2645803 A1 | 10/2013 |
| EP | 3361821 A1 | 8/2018 |
| EP | 3965525 B1 | 12/2023 |
| WO | 2018230980 A1 | 12/2018 |
| WO | 2019033231 A1 | 2/2019 |
| WO | 2019098135 A1 | 5/2019 |

OTHER PUBLICATIONS

First Office Action issued in corresponding Japanese application No. 2021-577827, mailed Sep. 22, 2023.

3GPP TSG-CT WG1 Meeting #120 Portoroz (Slovenia), Oct. 7-11, 2019; C1-196944 Title: Handling of pending NAS messages during resume of the N1 NAS signalling connection; Source to WG: vivo, Samsung.

3GPP TSG-CT WG1 Meeting #111 Osaka (Japan), May 21-25, 2018; C1-183826 Source: Ericsson; Title: UE action upon RRC inactive fallback.

SA WG2 Meeting #129 Dongguan, P.R. China, Oct. 15-19, 2018; S2-1811096 Source: Qualcomm Incorporated; Title: Early Data Transmission with Immediate RRC completion.

Ericsson, LG Electronics Inc., "AS—NAS interaction during Early Data Transmission (EDT)", R2-1818253, 3GPP TSG-RAN WG2 #104 Spokane, USA, Nov. 12-16, 2018.

Extended European Search Report issued in corresponding European application No. 19950521.5, mailed Jun. 7, 2022.

First Office Action issued in corresponding Indian application No. 202117054680, mailed Jun. 10, 2022.

First Office Action issued in corresponding Chinese application No. 202110969855.5, mailed Nov. 21, 2022.

Second Office Action issued in corresponding Chinese application No. 202110969855.5, mailed Jan. 13, 2023.

International Search Report issued in corresponding International Application No. PCT/CN2019/115126, mailed Jul. 23, 2020, 23 pages.

Written Opinion of the International Searching Authority issued in corresponding International Application No. PCT/CN2019/115126, mailed Jul. 23, 2020, 9 pages.

"RAN initiated Paging Solution", Agenda item: 21, Source: Huawei, China Telecom, 3GPP TSG-RAN3 Meeting #92, R3-161167, Nanjing, China, May 23-27, 2016, 5 pages.

Decision of Rejection issued in corresponding Japanese application No. 2021-577827, mailed Jan. 12, 2024.

Reconsideration Report by Examiner before Appeal issued in corresponding Japanese application No. 2021-577827, mailed May 31, 2024.

Notice of Termination of Reconsideration by Examiners before Appeal Proceedings issued in corresponding Japanese application No. 2021-577827, mailed Jun. 11, 2024.

First Office Action issued in corresponding Vietnamese Application No. 1-2022-00219, mailed on Sep. 6, 2024, 4 pages.

Notice of Reasons for Refusal issued in corresponding Japanese Application No. 2021-577927, dated Sep. 20, 2024, 5 pages.

First Office Action issued in corresponding Mexican Application No. MX/a/2022/000875, dated Oct. 16, 2024, 8 pages.

Trial Decision of Grant issued in corresponding Japanese Application No. 2021-577827, dated Nov. 5, 2024, 4 pages.

Hearing Notice issued in corresponding Indian application No. 202117054680, mailed Dec. 27, 2024.

* cited by examiner

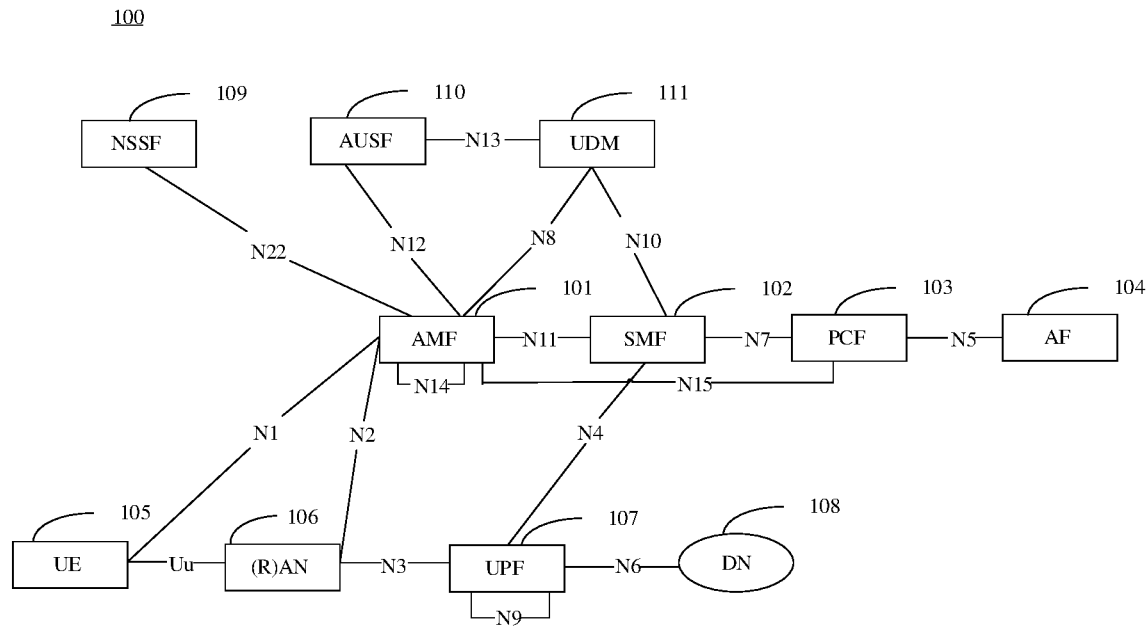

| A radio resource control (RRC) layer of a terminal device sends indication information to a non-access stratum (NAS) of the terminal device, where the indication information includes first state indication that is used for indicating a first RRC state | S210 |

| The NAS of the terminal device transfers the NAS of the terminal device to a first NAS state according to the first state indication | S220 |

FIG. 2

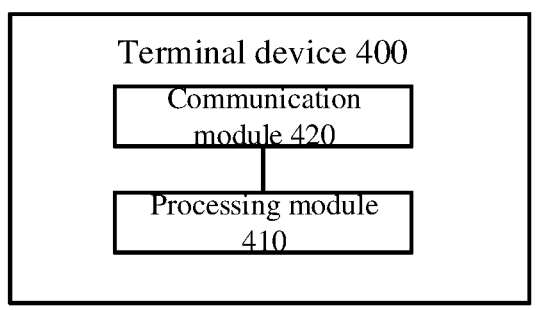

FIG. 3

RADIO COMMUNICATION METHOD AND TERMINAL APPARATUS

CROSS-REFERENCE TO RELATED APPLICATION

This application is a continuation of International Application No. PCT/CN2019/115126, filed on Nov. 1, 2019, the entire contents of which are incorporated herein by reference.

BACKGROUND

Embodiments of the present disclosure relate to the field of communication technologies, and in particular to a wireless communication method and a terminal device.

New Radio (NR) technologies can be applied to Internet of Things (IoT). In order to improve system performance, two optimization mechanisms are introduced: Control Plane Cellular IoT (CIOT) optimization and User Plane CIOT Optimization, and due to the introduction of the User Plane CIOT Optimization, a Radio Resource Control (RRC) state is added, that is, an idle state with suspend indication. There is also another RRC state for a terminal device, an RRC inactive state, where the RRC inactive state and the idle state with suspend indication correspond to different behaviors of the terminal device and the network device, respectively, and when the terminal device is in the above two states, RRC connection of the terminal device is suspended.

The network device can configure the terminal device to be in the idle state with suspend indication or the RRC inactive state. In this case, the terminal device can determine which state to transfer to according to whether the User Plane CIOT Optimization is used, which may cause that the state transferred to by the terminal device is inconsistent with the state configured by the network device. That is, the state of the terminal device is inconsistent with the state that the network device understands that the terminal device should be in, which affects subsequent communications.

SUMMARY

The embodiments of the present disclosure provide a wireless communication method and a terminal device.

In a first aspect, a wireless communication method is provided, which includes: sending, by a radio resource control (RRC) layer of a terminal device, indication information to a non-access stratum (NAS) of the terminal device, where the indication information includes first state indication that is used for indicating a first RRC state; and transferring, by the NAS of the terminal device according to the first state indication, the NAS of the terminal device to a first NAS state.

In a second aspect, a terminal device is provided, which is configured to perform the method in the foregoing first aspect or any possible implementation of the first aspect. Specifically, the terminal device includes a unit for performing the method in the foregoing first aspect or any possible implementation of the first aspect.

In a third aspect, there is provided a terminal device including a processor and a memory. The memory is used for storing a computer program, and the processor is configured to call and run the computer program stored in the memory to perform the method in the foregoing first aspect or the implementations thereof.

In a fourth aspect, a chip is provided, which is used to implement the method in the foregoing first aspect or the implementations thereof.

Specifically, the chip includes a processor configured to call and run a computer program from a memory, to cause a device installed with the chip to perform the method in the foregoing first aspect or the implementations thereof.

In a fifth aspect, a computer-readable storage medium is provided for storing a computer program that causes a computer to perform the method in the foregoing first aspect or the implementations thereof.

In a sixth aspect, a computer program product is provided, including computer program instructions that cause a computer to perform the method in the foregoing first aspect or the implementations thereof.

In a seventh aspect, a computer program is provided, which when running on a computer, causes the computer to perform the method in the foregoing first aspect or the implementations thereof.

BRIEF DESCRIPTION OF THE DRAWINGS

FIG. 1 is a schematic diagram of a architecture of a communication system according to an embodiment of the present disclosure;

FIG. 2 is a schematic diagram of a wireless communication method according to an embodiment of the present disclosure.

FIG. 3 is a schematic block diagram of a terminal device according to an embodiment of the present disclosure.

DETAILED DESCRIPTION

Figure 4:
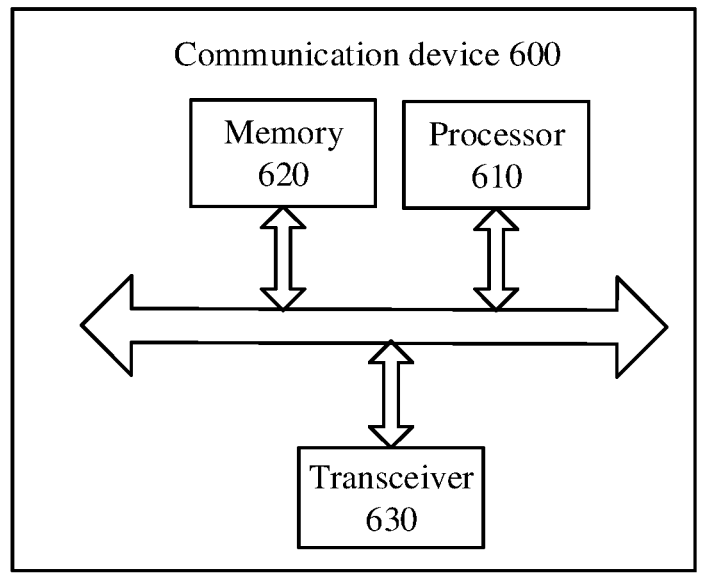
FIG. 4 is a schematic block diagram of a communication device according to another embodiment of the present disclosure.

The technical solutions in the embodiments of the present disclosure will be described below in connection with the drawings in the embodiments of the present disclosure. Obviously, the described embodiments are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

Exemplarily, a communication system 100 applied in an embodiment of the present disclosure is as shown in FIG. 1. The communication system 100 may include Access and Mobility Management Function (AMF) 101, Session Management Function (SMF) 102, Policy Control Function (PCF) 103, Application Function (AF) 104, User Equipment (UE) 105 (where UE may also be called a terminal device), an Access Network (AN) or Radio Access Network (RAN)

106, User Plane Function (UPF) 107, a Data Network (DN) 108, Network Slice Selection Function (NSSF) 109, Authentication Server Function (AUSF) 110, and Unified Data Management (UDM) 111.

The AMF is responsible for mobility management and is connected to the UE and the AN or RAN, the SMF is responsible for session management and is connected to the UPF or UDM, the PCF is responsible for policy control and can be connected to the SMF, AF, and AMF, and the UDM is responsible for subscription data management.

There can be different interfaces between the devices, for example, N1 is an interface for connection between the UE and AMF, N2 is an interface for connection between the AMF and AN or RAN, N3 is an interface for connection between the AN or RAN and UPF, N4 is an interface for connection between the SMF and UPF, N5 is an interface for connection between the PCF and AF, N6 is an interface for connection between the UPF and DN, N7 is an interface for connection between the SMF and PCF, N8 is an interface for connection between the AMF and UDM, N9 is an interface in the UPF, N10 is an interface for connection between the UDM and SMF, N11 is an interface for connection between the AMF and SMF, N12 is an interface for connection between the AUSF and AMF, N13 is an interface for connection between the AUSF and UDM, N14 is an interface in the AMF, N15 is an interface between the AMF and PCF, N22 is an interface for connection between the NSSF and AMF, and a Uu interface is an interface for connection between the UE and AN or RAN.

The terminal device 105 in the communication system 100 includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter; and/or another terminal device. A terminal device configured to perform communication through a wireless interface may be referred to as a "wireless communication terminal", a "wireless terminal" or a "mobile terminal". Examples of the mobile terminal include but are not limited to a satellite or cellular phone; a Personal Communications System (PCS) terminal that can combine cellular radio phones with data processing, fax, and data communication capabilities; a PDA that may include radio phones, pagers, Internet/intranet access, a Web browser, a memo pad, a calendar, and/or a Global Positioning System (GPS) receiver; and conventional laptop and/or palmtop receivers or other electronic devices including radio telephone transceivers. The terminal device may refer to an access terminal, user equipment (UE), a user unit, a user station, a mobile station, a mobile site, a remote station, a remote terminal, a mobile equipment, a user terminal, a terminal, wireless communication equipment, a user agent, or a user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

Optionally, Device to Device (D2D) communication may be performed between the terminal devices 105.

Optionally, the 5G system or 5G network may also be referred to as a New Radio (NR) system or NR network.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

The 5G technologies can also be applied to Internet of Things (IoT), and Internet of Things devices (IoT devices) can access a 5G Network using Wide Band (WB) E-UTRAN or Narrow Band (NB) E-UTRAN.

In order to improve system performance, two optimization mechanisms are introduced in the 5G system: Control Plane CIOT Optimization and User Plane CIOT Optimization.

A main feature of the Control Plane CIOT Optimization lies in that data can be transmitted by using Non-Access Stratum (NAS) signaling without using the N3 tunnel between the base station and the UPF to transmit data. By transmitting a small amount of data with this method, the cumbersome N3 user plane activation and deactivation signaling transmission can be reduced.

A main feature of the User Plane CIOT Optimization lies in that an RRC state is added, that is, an idle state with suspend indication. In addition, in the 5G system, the terminal device also has an RRC inactive state. The RRC inactive state and the idle state with suspend indication respectively correspond to different behaviors of the terminal device and the network device. For example, when the terminal device is in the idle state with suspend indication, the network device will save the context of the UE and release the N3 tunnel between the base station and the UPF, and when the terminal device is in the RRC inactive state, the network device will save the context of the UE and reserve the N3 tunnel between the base station and the UPF.

In the 5G system, the base station can determine that the UE enters a certain RRC state, for example, the RRC inactive state or the idle state with suspend indication, and configure the RRC layer of the UE to transfer to this RRC state. Further, the RRC layer of the UE may enter the RRC state according to the network configuration, and instruct the NAS of the UE to suspend the RRC connection. When the NAS of the UE receives the indication, it can determine which state to enter according to whether the UE is currently using the User Plane CIOT Optimization or not. For example, if the User Plane CIOT Optimization is being used, it enters a 5G Mobility Management Idle state with suspend indication (5GMM-Idle with suspend indication), or if the User Plane CIOT Optimization is not used, it enters a 5G Mobility Management connected state with inactive indication (5GMM-Connected with Inactive indication).

It can be seen that transferring of the state in the above method may cause the state of the terminal device to be inconsistent with the state of the terminal device understood by the network device. For example, if the base station configures to enter the RRC inactive state, but the User Plane CIOT Optimization is currently used, the NAS of the terminal device will enter the 5GMM-Idle state with suspend indication, resulting in inconsistency of the state between the RRC layer and the NAS of the terminal device, and the inconsistency between the current state of the terminal device and the network device's understanding of the current state of the terminal device results in misunderstanding of the signaling, which affects subsequent data transmission.

In view of this, the embodiments of the present disclosure provide a wireless communication method, which is beneficial to ensure the consistency of the state between the layers of the terminal device, and thus can ensure that the current state of the terminal device is consistent with understanding of the current state of the terminal device by the network device.

FIG. 2 is a schematic flowchart of a wireless communication method 200 according to an embodiment of the present disclosure. The method 200 can be performed by the terminal device in the communication system shown in FIG. 1. As shown in FIG. 2, the method 200 includes the following content.

At S210, a radio resource control (RRC) layer of a terminal device sends indication information to a non-access stratum (NAS) of the terminal device, where the indication information includes first state indication that is used for indicating a first RRC state.

At S220, the NAS of the terminal device transfers the NAS of the terminal device to a first NAS state according to the first state indication.

In some embodiments, the first RRC state may be any RRC state such as an RRC inactive state, an RRC idle state with suspend indication, an RRC Connected state, an RRC idle state or the like. In particular, in some embodiments, the first RRC state may be the RRC idle state with suspend indication or the RRC inactive state. When the terminal device is in the first RRC state, the RRC connection of the terminal device is suspended.

In an embodiment of the present disclosure, the terminal device may determine to transfer to the first RRC state by itself, for example, the terminal device may determine to transfer to the first RRC state when there is no uplink data to be transmitted; or the terminal device may determine to transfer to the first RRC state based on indication from the network device. For example, the RRC layer of the terminal device may receive a first message from the network device, and the first message may include second state indication that is used to instruct the RRC layer of the terminal device to transfer to the first RRC state.

Optionally, in some embodiments, the first message may be an RRC connection release message, or may also be other downlink RRC messages, which is not limited in the present disclosure.

In the case where the RRC layer of the terminal device determines to transfer to the first RRC state, the RRC layer of the terminal device may send indication information to the NAS layer of the terminal device, and the indication information may include the first state indication that is used for indicating the first RRC state, so that the NAS layer of the terminal device can transfer the NAS layer of the terminal device to the first NAS state according to the first state indication, and the RRC layer of the terminal device transfers to the first RRC state, where the first RRC state of the RRC layer corresponds to the first NAS state of the NAS, thereby ensuring consistency of the state between the layers of the terminal device, which is beneficial to ensure that the state to which the terminal device transfers is consistent with the state of the terminal device configured by the network device, thereby ensuring subsequent data transmission.

It should be understood that in an embodiment of the disclosure, the first RRC state of the RRC layer corresponds to the first NAS state of the NAS, that is, when the RRC layer of the terminal device is in the first RRC state and when the NAS of the terminal device is in the first NAS state, the behaviors on the corresponding access network and core network sides are consistent.

As an example, if the first RRC state is the RRC idle state with suspend indication, the first NAS state is the idle state with suspend indication, which is also called a 5GMM-Idle state with suspend indication; when there is uplink signaling or data transmission and the RRC layer of the terminal device is in the RRC idle state with suspend indication, the RRC layer sends RRC connection setup (RRCConnectionSetup) signaling to the network device; and when in the RRC inactive state, the RRC layer sends RRC Connection Resume (RRCConnectionResume) signaling to the network device.

As another example, if the first RRC state is the RRC inactive state, the first NAS state may be the inactive state, which is also called a 5GMM-Connected state with inactive indication.

Optionally, in an embodiment, the indication information includes the first state indication and RRC connection suspend indication, and the RRC connection suspend indication is used for instructing the terminal device to suspend the RRC connection with the network device. The terminal device may suspend the RRC connection with the network device according to the RRC connection suspend indication. In this case, the first state indication can be understood as a cause value for suspending the RRC connection, and the cause value can be, for example, the RRC idle state with suspend indication or the RRC inactive state. That is, since the terminal device is transferred to the RRC idle state with suspend indication or the RRC inactive state, the RRC connection of the terminal device needs to be suspended.

Optionally, as another embodiment, the indication information may only include the first state indication, and when the first RRC state indicated by the first state indication is the RRC idle state with suspend indication or the RRC inactive state, the terminal device may determine to suspend the RRC connection with the network device. In this case, the first state indication may also be considered as having a function of instructing to suspend the RRC connection.

Optionally, the terminal device in an embodiment of the present disclosure is a terminal device in the Internet of Things, that is, the terminal device may use the Control Plane CIOT Optimization and/or User Plane CIOT Optimization for data communication.

The method embodiments of the present disclosure are described in detail above with reference to FIG. 2, and the device embodiments of the present disclosure are described in detail below in conjunction with FIGS. 3 to 5. It should be understood that the device embodiments and the method embodiments correspond to each other, and for similar description, reference can be made to the method embodiments.

FIG. 3 is a schematic block diagram of a terminal device 400 according to an embodiment of the present disclosure. As shown in FIG. 3, the terminal device 400 includes a processing module 410 configured to send, at a radio resource control (RRC) layer, indication information to a non-access stratum (NAS) of the terminal device, where the indication information includes first state indication that is used for indicating a first RRC state; and transfer, at the NAS, the NAS of the terminal device to a first NAS state according to the first state indication.

Optionally, in some embodiments, if the first RRC state is an RRC idle state with suspend indication, the first NAS state is an idle state with suspend indication; or if the first RRC state is an RRC inactive state, the first NAS state is a connected state with inactive indication.

Optionally, in some embodiments, the indication information further includes RRC connection suspend indication that is used for instructing the terminal device to suspend the RRC connection with the network device.

Optionally, in some embodiments, the terminal device 400 further includes a communication module 420 configured to receive, at the RRC layer, second state indication sent by the network device, where the second state indication is used for indicating the first RRC state, and the processing module 410 is further configured to determine, at the RRC layer, the first state indication according to the second state indication.

Optionally, in some embodiments, the second state indication is included in an RRC connection release message.

Optionally, in some embodiments, the processing module 410 is further configured to transfer, at RRC layer, the RRC layer of the terminal device to the first RRC state according to the second state indication.

Optionally, in some embodiments, the terminal device is a terminal device in the Internet of Things.

Optionally, in some embodiments, the above-mentioned communication module may be a communication interface or a transceiver, or an input/output interface of a communication chip or a system-on-chip. The above-mentioned processing module may be one or more processors.

It should be understood that the terminal device 400 according to the embodiments of the present disclosure can correspond to the terminal device in the method embodiments of the present disclosure, and the above-mentioned and other operations and/or functions of the units in the terminal device 400 are used to implement the process for the terminal device in method 200 as shown in FIG. 2, which will not be repeated here for the sake of brevity.

FIG. 4 is a schematic structural diagram of a communication device 600 according to an embodiment of the present disclosure. The communication device 600 shown in FIG. 4 includes a processor 610. The processor 610 can call and run a computer program from a memory to implement the methods in the embodiments of the present disclosure.

Optionally, as shown in FIG. 4, the communication device 600 can further include a memory 620. The processor 610 can call and run the computer program from the memory 620 to implement the methods in the embodiments of the present disclosure.

The memory 620 can be a separate device independent of the processor 610, or can be integrated in the processor 610.

Optionally, as shown in FIG. 4, the network device 600 can further include a transceiver 630, and the processor 610 can control the transceiver 630 to communicate with other devices, and specifically to transmit information or data to other devices, or receive information or data transmitted from other devices.

The transceiver 630 can include a transmitter and a receiver. The transceiver 630 can further include an antenna, and the number of the antennas can be one or more.

Optionally, the communication device 600 can specifically be a network device in the embodiments of the present disclosure, and the communication device 600 can carry out the corresponding processes which are implemented by the network device in the methods of the embodiments of the present disclosure, which will not be repeated here for the sake of brevity.

Optionally, the communication device 600 can specifically be a mobile terminal/terminal device in the embodiments of the disclosure, and the communication device 600 can implement the corresponding processes which are implemented by the mobile terminal/terminal device in the methods according to the embodiments of the present disclosure, which will not be repeated here for the sake of brevity.

Figure 5:
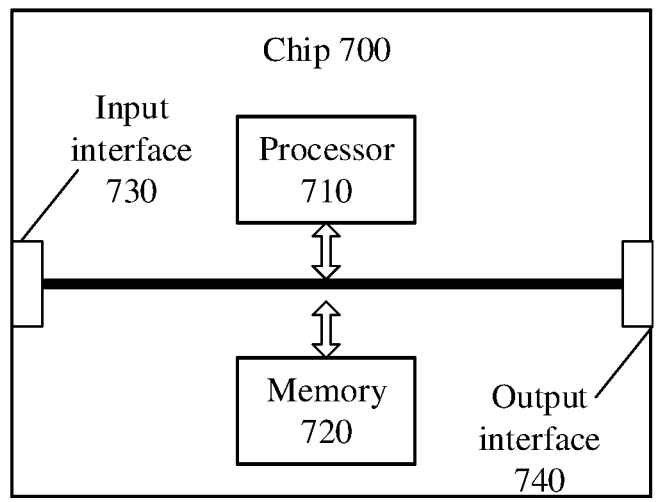
FIG. 5 is a schematic block diagram of a chip according to an embodiment of the present disclosure.

FIG. 5 is a schematic structural diagram of a chip according to an embodiment of the present disclosure. A chip 700 shown in FIG. 5 includes a processor 710 which can call and run a computer program from a memory to implement the methods in the embodiments of the present disclosure.

Optionally, as shown in FIG. 5, the chip 700 can further include a memory 720. The processor 710 can call and run the computer program from the memory 720 to implement the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding processes which are implemented by the mobile terminal/terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

The embodiments of the present disclosure also provide a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/ terminal device in the methods of the embodiments of the present disclosure, which will not be repeated here for the sake of brevity.

The embodiments of the disclosure also provide a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for wireless communication, comprising:
   sending, by a radio resource control (RRC) layer of a terminal device, indication information to a non-access stratum (NAS) of the terminal device, wherein the indication information comprises first state indication that is used for indicating a first RRC state of the RRC layer; and
   transferring, by the NAS of the terminal device according to the first state indication, the NAS of the terminal device to a first NAS state,
   wherein the first RRC state of the RRC layer comprises an RRC idle state with suspend indication and an RRC inactive state, and RRC connection of the terminal device is suspended in both the RRC idle state with suspend indication and the RRC inactive state,
   in response to that the indication information indicates the RRC layer being in the RRC idle state with suspend indication, the NAS is transferred to an idle state with suspend indication; and
   in response to that the indication information indicates the RRC layer being in the RRC inactive state, the NAS is transferred to a connected state with inactive indication.

2. The method according to claim 1, further comprising:
   receiving, by the RRC layer of the terminal device, second state indication sent by a network device, wherein the second state indication is used for indicating the first RRC state; and
   determining, by the RRC layer of the terminal device according to the second state indication, the first state indication.

3. The method according to claim 2, wherein the second state indication is comprised in an RRC connection release message.

4. The method according to claim 1, wherein the terminal device is a terminal device in Internet of Things.

5. A terminal device, comprising:
   a processor; and
   a memory for storing a computer program,
   wherein the processor is configured to call and run the computer program stored in the memory to perform operations of:
   sending, at a radio resource control (RRC) layer, indication information to a non-access stratum (NAS) of the terminal device, wherein the indication information comprises first state indication that is used for indicating a first RRC state of the RRC layer; and
   transferring, at the NAS, the NAS of the terminal device to a first NAS state according to the first state indication,
   wherein the first RRC state of the RRC layer comprises an RRC idle state with suspend indication and an RRC inactive state, and RRC connection of the terminal device is suspended in both the RRC idle state with suspend indication and the RRC inactive state,
   in response to that the indication information indicates the RRC layer being in the RRC idle state with suspend indication, the NAS is transferred to an idle state with suspend indication; and
   in response to that the indication information indicates the RRC layer being in the RRC inactive state, the NAS is transferred to a connected state with inactive indication.

6. The terminal device according to claim 5, further comprising:
   a transceiver configured to receive, at the RRC layer, second state indication sent by a network device, wherein the second state indication is used for indicating the first RRC state,
   wherein the processor is further configured to determine, at the RRC layer, the first state indication according to the second state indication.

7. The terminal device according to claim 6, wherein the second state indication is comprised in an RRC connection release message.

8. The terminal device according to claim 5, wherein the terminal device is a terminal device in Internet of Things.

9. A non-transitory computer-readable storage medium for storing a computer program that, when running on a computer, causes the computer to perform operations of:
   sending, by a radio resource control (RRC) layer of a terminal device, indication information to a non-access stratum (NAS) of the terminal device, wherein the indication information comprises first state indication that is used for indicating a first RRC state of the RRC layer; and
   transferring, by the NAS of the terminal device according to the first state indication, the NAS of the terminal device to a first NAS state,
   wherein the first RRC state of the RRC layer comprises an RRC idle state with suspend indication and an RRC inactive state, and RRC connection of the terminal device is suspended in both the RRC idle state with suspend indication and the RRC inactive state,
   in response to that the indication information indicates the RRC layer being in the RRC idle state with suspend indication, the NAS is transferred to an idle state with suspend indication; and
   in response to that the indication information indicates the RRC layer being in the RRC inactive state, the NAS is transferred to a connected state with inactive indication.

10. The non-transitory computer-readable storage medium according to claim 9, wherein the operations further comprise:
    receiving, by the RRC layer of the terminal device, second state indication sent by a network device, wherein the second state indication is used for indicating the first RRC state; and
    determining, by the RRC layer of the terminal device according to the second state indication, the first state indication.

11. The non-transitory computer-readable storage medium according to claim 10, wherein the second state indication is comprised in an RRC connection release message.

12. The non-transitory computer-readable storage medium according to claim 9, wherein the terminal device is a terminal device in Internet of Things.

* * * * *